United States Patent [19]

Widjaja et al.

[11] Patent Number: 5,440,553
[45] Date of Patent: Aug. 8, 1995

[54] OUTPUT BUFFERED PACKET SWITCH WITH A FLEXIBLE BUFFER MANAGEMENT SCHEME

[76] Inventors: Indra Widjaja, 30 St. Charles Street West, Apt. 1522, Toronto, Ontario, Canada, M4Y 1R5; Alberto Leon-Garcia, 8 Longspur Road, Toronto, Ontario, Canada, M4B 2Z2

[21] Appl. No.: 359,350

[22] Filed: Dec. 19, 1994

Related U.S. Application Data

[63] Continuation of Ser. No. 140,599, Oct. 21, 1993, abandoned, which is a continuation of Ser. No. 894,116, Jun. 5, 1992, Pat. No. 5,274,642.

[51] Int. Cl.$^6$ ............................................. H04L 12/56
[52] U.S. Cl. ...................................... 370/60; 370/94.1
[58] Field of Search ........................ 370/94.1, 60, 60.1, 370/58.1, 58.3, 88, 56, 86; 340/825.5, 825.51

[56] References Cited

U.S. PATENT DOCUMENTS

| | | | |
|---|---|---|---|
| 4,516,238 | 5/1985 | Huang et al. | 370/60 |
| 4,542,497 | 9/1985 | Huang et al. | 370/60 |
| 4,760,570 | 7/1988 | Acampora et al. | 370/60 |
| 4,817,084 | 3/1989 | Arthurs et al. | 370/60 |
| 4,849,968 | 7/1989 | Turner | 370/60 |
| 4,866,701 | 9/1989 | Giacopelli et al. | 370/60 |
| 4,893,304 | 1/1990 | Giacopelli et al. | 370/60 |
| 4,899,335 | 2/1990 | Johnson, Jr. et al. | 370/60 |
| 5,126,999 | 6/1992 | Munter et al. | 370/60 |
| 5,274,642 | 12/1993 | Widjaja et al. | 370/94.1 |

FOREIGN PATENT DOCUMENTS 0315918  4/1988  European Pat. Off. .

OTHER PUBLICATIONS

K. E. Batcher, "Sorting networks and their applications", *The Proceedings of AFIPS 1968 SJCC*, 1968, pp. 307–314 (reprinted at pp. 576–582 in enclosed copy).
Alan Huang, et al., "Starlite: A Wideband Digital Switch", *IEEE Proc. Globecom'84*, Atlanta, Ga., Dec. 1984, pp. 121–125.
Joseph Y. Hui, et al., "A Broadband Packet Switch for Integrated Transport", *IEEE Journal on Selected Areas in Communications*, vol. SAC-5, No. 8, Oct. 1987, pp. 1264–1273.
Yu-Shuan Yeh, et al., "The Knockout Switch: A Simple, Modular Architecture for High-Performance Packet Switching", *IEEE Journal on Selected Areas in Communications*, vol. SAC-5, No. 8, Oct. 1987, pp. 1274–1282.
Michel Devault, et al., "The Prelude ATD Experiment: Assessments and Future Prospects", *IEEE Journal of Selected Areas in Communications*, vol. SAC-6, No. 9, Dec. 1988, pp. 1528–1537 (reprinted at pp. 167–176 in enclosed copy).
Hiroshi Kuwahara, et al., "A shared buffer memory switch for an ATM exchange", *IEEE Proc. ICC*, Boston, Mass., Jun. 1989, pp. 4.4.1–4.4.5.
J. Y. Hui, "Switching and Traffic Throughout Integrated Broadband Networks," Kluwer Academic Publishers, 1990, pp. 146–151.
J. N. Giacopelli, et al., "Sunshine: A High Performance Self-Routing Broadband Packet Switch Architecture", *Proc. ISS*, Stockholm, Sweden, May 1990, pp. 123–129.

*Primary Examiner*—Douglas W. Olms
*Assistant Examiner*—Ajit Patel
*Attorney, Agent, or Firm*—Knobbe, Martens, Olson & Bear

[57] ABSTRACT

An output-buffered packet switch with priority packet transmission and a flexible buffer management scheme is disclosed. The switch consists of a sorting network at the input, a nonblocking routing network at the output, and multiple modules of column-fill networks together with the storage elements connected in series to provide a novel buffer management scheme. Each module provides one dedicated buffer for each output port, except the last module where the storage is shared by all the outputs. The combination of dedicated and shared buffering gives high performance for a wide range of traffic conditions. The switch is expandable in the sense that its performance can be enhanced by simply adding more modules. The switch design is distributed and has self-routing capabilities, so it can operate at very high data rates. The output-buffered packet switch can be used to implement a centralized control for another packet switch of higher speed but same functionality.

23 Claims, 10 Drawing Sheets

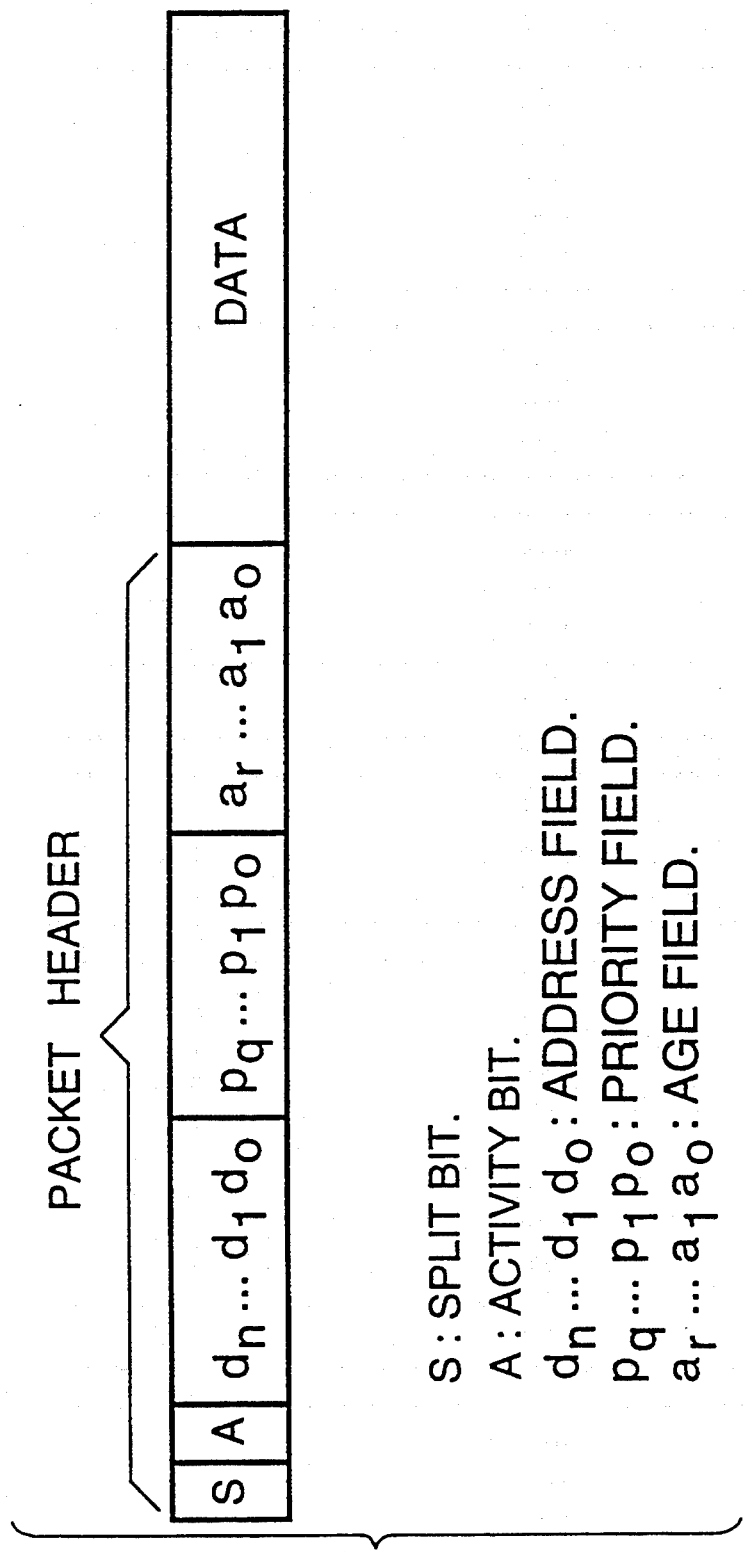

BANYAN ROUTING NETWORK

OUTPUT BUFFERED PACKET SWITCH WITH A FLEXIBLE BUFFER MANAGEMENT SCHEME

This application is a continuation of application Ser. No. 08/140,599, filed Oct. 21, 1993, abandoned, which is a continuation of Ser. No. 07/894,116, filed Jun. 5, 1992 which issued as U.S. Pat. No. 5,274,642 on Dec. 28, 1993.

FIELD OF INVENTION

The present invention relates in general to packet switching systems, and more particularly to an output-buffered packet switch that has a plurality of inputs and outputs, implements a hybrid of shared and dedicated buffering, uses distributed architecture, provides priority transmission, guarantees packet sequence, is expandable, and can serve as a central control for a packet switch of higher speed.

BACKGROUND OF THE INVENTION

High performance packet switches that interconnect a plurality of input ports to a plurality of output ports are critical components in communication networks requiring high transmission speeds. These switches can be used to transfer packets carrying a variety of services such as video, image, voice, and data services. Because of the high transfer rates, these switches are typically implemented using highly distributed, self-routing interconnection networks. In order to ease hardware implementation, these switches usually operate in a time-slotted fashion where the time slot is equal to the transmission time of one packet.

Packet switches traditionally incorporate buffers in order to deal with temporary surges in traffic. The placement of buffers in a packet switch strongly influences the packet loss, packet delay, and throughput performance. Packet switches having buffers at the switch input ("input buffered switches") and that transfer packets on a First-In-First-Out (FIFO) basis suffer from head-of-line blocking which results in reduced throughput performance (see J. Y. Hui and E. Arthurs, "A broadband packet switch for integrated transport," IEEE J. Select Areas in Commun., vol. SAC-5, pp. 1264–1273, Dec. 1987). On the other hand, packet switches having buffers at the switch output ("output buffered switches") can achieve maximum throughput close to 100% (see Y. S. Yeh, M. G. Hluchyj and A. S. Acampora, "The Knockout switch: A simple, modular architecture for high-performance packet switching," IEEE J. Select. Areas Commun., vol.SAC-5, pp.734–743, October 1987). Since an output buffer must be able to accept simultaneous packet arrivals (up to the number of input lines for no packet loss), the switch interconnection fabric normally provides multiple, and up to $N^2$, disjoint paths from its N inputs to its N outputs. As a result, a straightforward implementation of an output-buffered switch can lead to hardware complexity of up to $N^2$ in the case where a hardware unit is dedicated to each path.

In addition to the placement of buffers, buffer allocation is also an important consideration in packet switch design. When buffers are dedicated to packets destined to each output of a switch, a large buffer size is required to attain a low packet loss rate. At the other extreme, when buffers are completely shared by all the outputs, significant buffer reductions can be achieved under certain traffic conditions. Examples of shared-buffer switches with a centralized control can be found in the Prelude and Hitachi proposals (see M. Devault, J. Cochennec, and M. Servel, "The Prelude ATD experiment: assessments and future prospects," IEEE J. Select. Areas in Commun., vol.SAC-6, pp.1528–1537, December 1988 and H. Kuwuhara, N. Endo, M. Ogino, and T. Kozaki, "Shared buffer memory switch for an ATM exchange," Proc. ICC, Boston, Mass., pp.4.4.1–4.1.5, June 1989). An example of a packet switch with distributed control is the Starlite switch (see A. Huang and S. Knauer, "Starlite: A Wideband Digital Switch," Proc. GLOBECOM'84, Atlanta, Ga., pp.121–125, December 1984, and U.S. Pat. Nos. 4,516,238 and 4,542,497 (Huang et al)). Since a shared storage buffer can be accessed by any input and any output, some inputs that coincidentally send packets to a specific group of outputs can consume all of the buffer space, thereby preventing (or "locking out") other packets destined for other outputs to access the buffer space. This phenomenon in turn degrades the performance of the switch. In view of the lock-out problem, it is thus more desirable to allocate only a partial amount of the buffer space as a shared storage and dedicate parts of the remaining buffer space to each output.

A variety of packet switches based on the combination of Batcher sorting and banyan routing networks have been proposed. One example is the Starlite switch discussed above, which is based on the Batcher sorting network, a trap network, and a banyan routing network. The Batcher network sorts the incoming packets according to the destination addresses (See K. Batcher, "Sorting Networks and their Applications," Proc. AFIPS, pp.307–314, 1968). The trap network identifies packets with repeated addresses and recirculates them to the input of the Batcher network. The packets that are not recirculated by the trap network are routed to the output ports in nonblocking fashion by a banyan network. Unfortunately, to achieve high performance, the size of the Batcher network needs to be a large multiple of the input lines. This increases the hardware complexity. The Starlite switch also suffers from the buffer lock-out problem discussed above because of its full buffer sharing configuration. The Sunshine switch disclosed in J. Giacopelli, M. Littlewood, and W. D. Sincoskie, "Sunshine: A high performance self-routing broadband packet switch architecture," Proc. ISS, Stockholm, Sweden, pp.123–129, May 1990, and in U.S. Pat. No. 4,893,304 (Giacopelli, et al ), overcomes some of the difficulties of the Starlite switch through a combination of output queuing and packet recirculation. The trap network operation in the Starlite system is modified in the Sunshine system so that up to K packets can be transferred to each output buffer through K parallel banyan routing networks. The trap network recirculates those packets that cannot be transferred to the output buffers.

An object of an aspect of this invention is to realize an exact implementation of an output-buffered packet switch that overcomes the complexity problems associated with implementations that use multiple disjoint paths through the use of multiple but shared interconnection paths, and that provides both shared and dedicated buffering, thus achieving buffer efficiency while avoiding the lockout problem.

SUMMARY OF THE INVENTION

According to an aspect of the present invention, there is provided an output-buffered packet switch implementing a novel buffer management scheme. The switch design is fully distributed and has self-routing capabilities, so it can achieve high transfer rates. The switch preserves the sequence of the packets flowing between each input-output pair. Priority transfer of packets can also be supported with almost no additional cost.

The switch of the present invention provides output buffering without resorting to faster internal circuits, through the application of a column-fill operation. This operation guarantees that packet losses occur only from the shared buffer. This operation also prevents the lockout phenomenon that can occur in fully shared buffer switches. Each column-fill operation is implemented by an identical module, and the number of dedicated buffers is equal to the number of such modules. The buffer sharing operation is implemented by the same module, except that it can be of a different size. The size of the dedicated and shared buffers can be selected so that the switch packet loss rate can be kept within desired levels under a broad range of traffic conditions.

BRIEF DESCRIPTION OF THE DRAWING

A detailed description of the preferred embodiment is provided herein below, with reference to the following drawings in which:

FIG. 2 is a representation of the packet format utilized in the switch in accordance with the preferred embodiment.

DETAILED DESCRIPTION OF THE PREFERRED EMBODIMENT

Figure 1A:
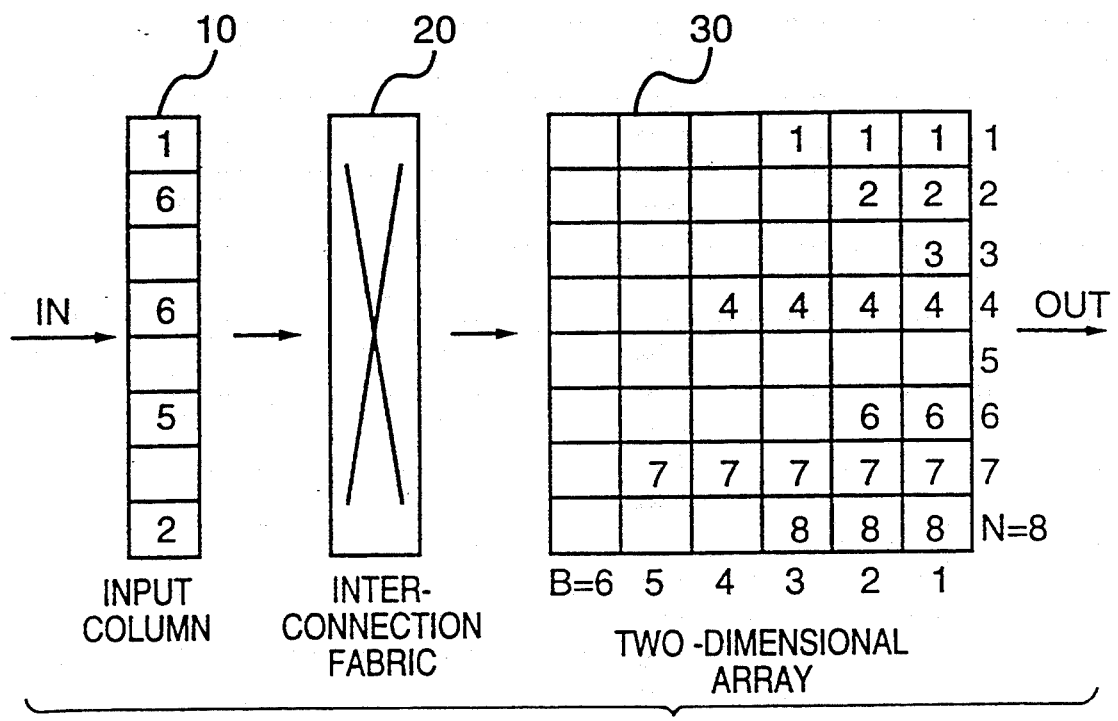
FIG. 1a is a schematic representation showing operation of an output buffered switch according to the present invention in its broadest aspect.

With reference first to FIG. 1a, a description of the general operation of an output-buffered switch is provided. The switch receives a plurality of packets in an input column 10 and then routes the received packets via an interconnection fabric 20 to a two-dimensional array 30. The output queues are organized in the two-dimensional array 30 with B columns labelled from right to left, and N rows labelled from top to bottom (for concreteness, the figure shows the case for which $N=8$ and $B=6$). Each entry in the array can store exactly one packet. Each row represents an output queue with the number of columns equal to the depth of the queue, which is assumed to be of equal size B for all output queues. Thus, row i stores the packets that are destined for output port i.

During each time slot, the interconnection fabric 20 accepts an input column of arriving packets 10 and places them in the array 30. The maximum number of packets in an input column need not be the same as the number of output ports N. For example, in multicast applications a packet arrival at an input line can be destined for several output ports. In this scenario these packets will have already been duplicated and will appear in the input column to the interconnection fabric 20. In the case where there is only one priority class and where packets are handled on a FIFO basis, each input packet is stored in the rightmost available column of the row corresponding to its destination output port. In the event that input packets cannot be placed in the array because the corresponding rows are full, these packets are temporarily held in the input column 10. The packets in the first column of array 30 (ie. $j=1$), are then transferred to the corresponding output ports. As packets in the first column $j=1$ are transferred out, all packets stored behind them (ie. $j=2, 3, 4 \ldots$ etc.) synchronously move to the right by one column. In the final step, packets in the input column that have not already been placed in the array are offered to the newly vacated Bth column. Any packets that cannot be placed in column B are lost. The switch is then ready to receive packets in the next time slot.

According to the present invention it has been recognized that since the output addresses of the packets stored in each column of array 30 are not repeated and since an arriving packet is offered to a given column before being offered to any other column to its left, it can be concluded that at all time slots the number of packets in any given column is greater than or equal to the number of packets in the column to its immediate left. In fact, if a given column contains a packet destined for a particular output, then every column to its right must also contain a packet destined for the same output.

Therefore according to an important aspect of the present invention the placement of packets from the input column 10 into the array 30 is implemented by multiple applications of the following column-fill operation, with reference to the illustrative example shown schematically in FIG. 1a. Step 1: Route the packets from input column 10 to the empty entries in the first column ($j=1$) of array 30, if the input column 10 contains packets with the appropriate addresses. If there is more than one packet with an address corresponding to an empty entry, select only one of the packets to fill the entry. Step 2: The packets in the input column that were not placed in the first column ($j=1$) are routed to the second column ($j=2$) in array 30 using the same procedure as in Step 1. The process of placing packets from the input column 10 in each successive array column is continued until all packets have been placed, or until the last or left-most column B in array 30 is reached. The last column-fill operation takes place after the columns in the array have been shifted to the right. Packets that cannot be placed in the last column B are lost. Therefore, according to the present invention the process of placing input packets in an output buffered switch is implemented by a series of column-fill operations.

The column-fill operation needs to be modified in the case where there are several classes of priority service. Each time an input column is offered (ie. routed) to the array, an input packet with a given destination address is placed in the rightmost entry in the corresponding row not already occupied by a packet of equal or higher priority. Any displaced lower priority packet and all packets to its left, if any, are then shifted to the left by one column in the same row. In terms of the column-fill operation, each time that an input column is offered to an array column, an entry in the array column is filled with an input packet that has a destination address corresponding to the entry, that has a priority higher than that of the packet currently in the array column, and that has priority higher than that of any other input packet with the same destination address. When a higher priority packet from the input column displaces a lower priority packet in the array column, the displaced lower priority packet is placed in the input column. In order for the displaced packet to be able to subsequently push back those packets that were to its left in its output queue, the system of the present invention provides that an ageing field be incorporated into the packet header.

Before describing a generalized embodiment for realizing the column-fill operation discussed above with reference to FIG. 1a, it is necessary to consider the packet header structure. The packet header, shown in FIG. 2, consists of a split bit, an activity bit, an address field, a priority field, and an age field. The split bit is normally set to zero, except briefly during part of the column-fill operation. The activity bit is used to determine whether an entry contains a packet (represented by a zero bit) or is empty (represented by a one bit). The address field contains the address of the output to which the packet is destined. For a switch fabric with N output ports, the address field requires $n = \log_2 N$ bits. The priority field is optional and can be used to divide the arriving packets into several service classes. Packets having priority value i will be referred to herein as class-i packets. Class 0 has the highest priority, class 1 has the second highest priority, etc. The age field is used to maintain sequence within each priority class for each input-output port pair. This is done by giving packets that have stayed in the switch fabric for t time slots, t levels lower in the age value over the new packets belonging to the same input-output pair. The binary number determined by the packet header, with the split bit as the most significant bit, can be interpreted as defining a larger set of priority classes. With this interpretation, empty packets normally constitute the lowest priority class.

The generalized embodiment of the column-fill network according to the present invention for effecting the column-fill operation described above, is shown in FIG. 3. The column-fill network 50 is composed of a sort network 60, a trap network 70, a sort network 80, a routing network 90, and a delay circuit 96. The columnfill network 50 operates on two columns of packets $a_1, a_2, \ldots, a_N$ and $b_1, b_2, \ldots, b_K$. The packets $a_1, a_2, \ldots, a_N$ and $b_1, b_2, \ldots, b_K$ enter the network simultaneously, and the packets $f_1, f_2, \ldots, f_N$ and $g_1, g_2, \ldots, g_K$ exit the network simultaneously after a fixed latency time $T_L$ sec. Packet $a_n$ corresponds to the nth entry of a column in array 30 (FIG. 1a), and $b_k$ corresponds to the kth entry in an input column. The two columns may contain empty entries. In this case, an empty entry is represented by a packet with the activity bit set to one. Column $f_1, f_2, \ldots, f_N$ corresponds to the array column after the column-fill operation has been carried out. Therefore, $f_n$ is equal to $a_n$ unless a higher-priority packet with destination n is found in the input column. If one or more such higher priority packets are found, then $f_n$ is equal to the input packet that has a destination address corresponding to the entry and has priority higher than that of any other input packet with the same destination address. When a higher priority packet from the input column displaces a lower priority packet in the array column, the displaced lower priority packet is placed in the input column. In the discussion above empty packets are treated as belonging to the lowest priority class. The packets in $g_1, g_2, \ldots, g_k$ consist of all the packets in $a_1, a_2, \ldots, a_N$ and $b_1, b_2, \ldots, b_K$ that do not appear in $f_1, f_2, \ldots, f_n$, and their order of appearance does not matter.

Figure 3:
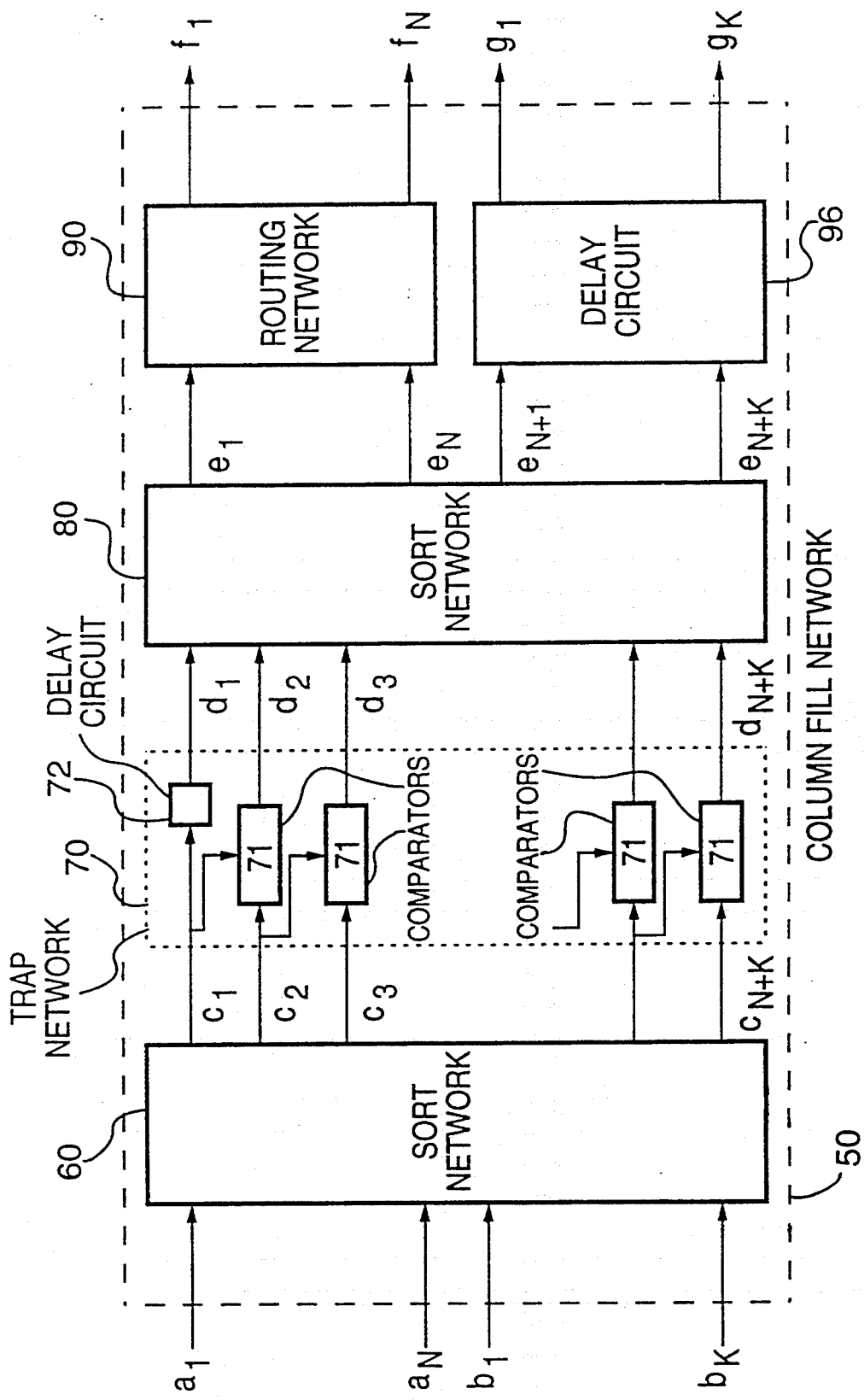
FIG. 3 is a block diagram of a generalized column-fill network according to the present invention.

The sort network 60 receives the packets $a_1, a_2, \ldots, a_N$ and $b_1, b_2, \ldots, b_K$ and sorts them in ascending order according to the split bit (which is set to zero), activity bit, destination address bits, priority bits, and age bits to produce the packets $c_1, c_2, \ldots, c_{N+K}$ in FIG. 3. Active packets appear in the first part of $c_1, c_2, \ldots, c_{N+K}$ and empty packets appear in the latter part. Within the active packets, packets are ordered according to destination, and for each destination according to priority and age.

Among the packets destined for output port n, the trap network 70 selects the packet of highest priority, and if there is more than one such packet, it picks the packet having the lowest age value. The first packet in the sequence $c_1, c_2, \ldots, c_{N+K}$ with destination address n satisfies the condition for selection. The trap network identifies the first appearance of an address through an address comparator circuit 71 that compares the destination fields in the headers of adjacent packets in the sequence $c_1, c_2, \ldots, c_{N+K}$, and it modifies the split bit according to the result of the comparison to produce the packets $d_1, d_2, \ldots, d_{N+K}$. There is no comparator circuit associated with $c_1$, but a delay circuit 72 is inserted to compensate for the delay introduced in the other comparator circuits 71. The comparator circuit with inputs $c_j$ and $c_{j+1}$ is defined as being associated with packet $c_{j+1}$. When a comparator circuit 71 identifies that the two addresses are the same, the split bit of the packet associated with the comparator is set to one, the activity bit is left at "0", and each bit in the destination, priority, and age fields is complemented. Thus the header field of such packets begin with the bits "10". When the comparator circuit determines that the two addresses are different, the associated packet is identified as the first occurrence of a particular destination address in the sequence $c_1, c_2, \ldots, c_{N+K}$, the split bit is left at zero, and all other header bits are left unchanged. Thus the header field of such packets begin with the bits "00". The split bit in empty packets is left at zero, so their header fields begin with the bits "01".

The sort network 80 in FIG. 3 sorts the packets $d_1, d_2, \ldots, d_{N+K}$ in ascending order according to split bit, activity bit, destination address bits, priority bits, and age bits. At the output of the sort network 80, the split bits of all packets are reset to zero, and the bits of the destination, priority, and age fields of all packets exiting the lower K outputs of the sorter, which include all the packets which previously had a split bit=1, are complemented in order to recover the original destination addresses. In the sequence $e_1, e_2, \ldots, e_{N+K}$, packets that entered the sort network 80 with the prefix "00" appear first in increasing order of destination address, followed by the empty packets that entered the network 80 with the prefix "01", followed finally by packets that entered the network 80 with the prefix "10", in decreasing order of destination address. Therefore the sequence $e_1, e_2, \ldots, e_{N+K}$ forms a circular bitonic list, as described in J. Y. Hui, "Switching and Traffic Theory for Integrated Broadband Networks" Kluwer Academic Publishers, Boston, 1990. Thus the packets that are to be stored in the array column appear in the upper portion of $e_1, \ldots, e_N$. Packets that are to be placed in the input column appear in the lower portion of $e_{N+1}, e_{N+2}, \ldots, e_{N+K}$.

A non-blocking routing network 90 takes the packets $e_1, e_2, \ldots, e_N$ and routes them to the appropriate outputs $f_1, f_2, \ldots, f_N$ specified by the destination address field of each packet.

The packets $e_{N+1}, e_{N+2}, \ldots, e_{N+K}$ are transferred through a delay circuit 96 directly to the outputs $g_1, g_2, \ldots, g_K$. The delays in the circuit are designed so that packets $f_1, f_2, \ldots, f_N$ and $g_1, g_2, \ldots, g_K$ appear simultaneously at the output of the column-fill network 50.

Figure 4:
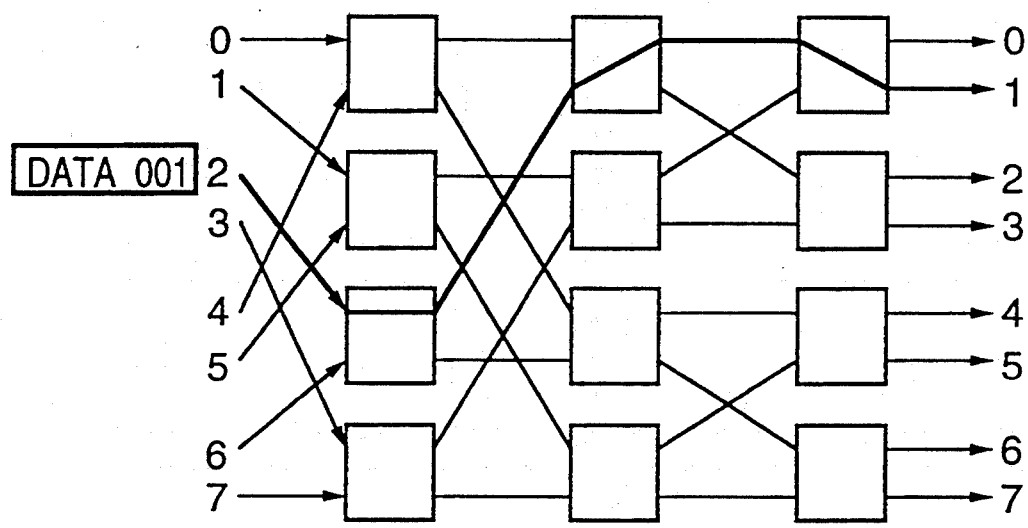
FIG. 4 is a block diagram of a Banyan network of size 8 by 8, Which may be used with the column-fill network of FIG. 3.

The packets in $e_1, e_2, \ldots, e_N$ are ordered according to destination address and all empty packets appear in the later portion of the sequence. The packets can therefore be routed in non-blocking fashion by the banyan routing network of the type shown in FIG. 4.

The sort networks 60 and 80 can be implemented using an $(N+K) \times (N+K)$ Batcher network (see K. Batcher, "Sorting Networks and their Applications," Proc. AFIPS, pp.307-314, 1968, and U.S. Pat. No. 3,428,946 (Batcher)).

The description to this point completes the implementation of the generalized column-fill network according to the present invention.

The column-fill network 50 developed above can be simplified significantly as described below. Firstly, it may be appreciated that the routing network 90 is only required when the column-fill operation involves the first column. If the first column $j=1$ is not involved, then it is not yet necessary to route the packets to their corresponding destination addresses. Therefore the routing network 90 and the delay circuit 96 can be removed. If this is done, then in subsequent column-fill networks, the array column $a_1, a_2, \ldots, a_N$ and the input column $b_1, \ldots, b_K$ will form a circular bitonic list. It is well-known that a circular bitonic list can be sorted by a banyan network for which the nodes are 2×2 sorters (see J. Y. Hui, "Switching and Traffic Theory for Integrated Broadband Networks" Kluwer Academic Publishers, Boston, 1990, page 148). The sort network 60 in FIG. 3 can therefore be replaced by such a banyan network. When the column-fill network 50 is implemented with the sort network 60 using a banyan sorter, and without the routing network 90 and the delay circuit 96, the resulting simplified column-fill will be henceforth called the "streamlined column-fill network."

An alternative implementation of the streamlined column-fill network is as follows.

The trap network 70 and the sort network 80 in FIG. 3 can also be simplified by replacing them with a modified trap network, a running adder network (see the Huang reference cited above), and a reverse banyan network. The modified trap network performs as above except that the bit complement operation is omitted. The running adder network uses the results of the comparator circuits to steer the selected packets to $e_1, \ldots, e_N$, and to steer the remaining packets to $e_{N+1}, \ldots, e_{N+K}$. The packets will appear in the same order as in the above streamlined column-fill networks.

Figure 5:
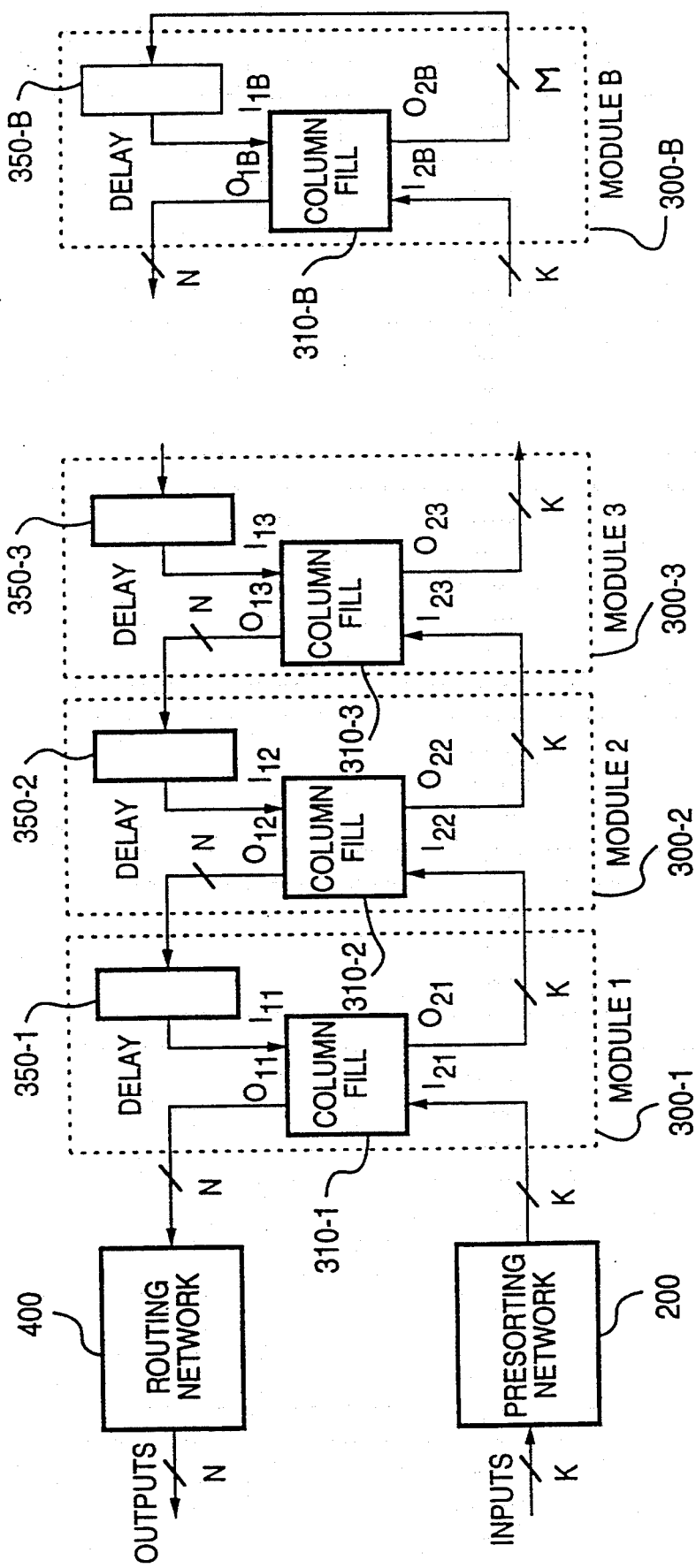
FIG. 5 is a block diagram of a packet switch architecture according to the preferred embodiment of the present invention.

FIG. 5 is a block diagram of the packet switch according to the preferred embodiment of the present invention. The switch comprises a pre-sorting network 200, a nonblocking routing network 400, B-1 identical modules 300_1 to 300_B-1 each consisting of a delay element 350_1 to 350_B-1 and a column-fill network 310_1 to 310_B-1, and one module 300_B consisting of a delay element 350_B and a column-fill network 310_B that implements buffer sharing. Illustratively, the delay elements can be implemented using shift registers. Alternative embodiments may use RAM devices or FIFO buffers.

The switch in FIG. 5 implements the column-fill operations described in the previous section in pipelined and distributed fashion. The presorting network 200 and the routing network 400 are used only when the streamlined column-fill network is adopted. When streamlined column-fill networks are not used, the switch operates in the following way. At the beginning of each time slot, the switch accepts up to K packets from its input lines. These packets correspond to an input column 10 in FIG. 1. This input column is offered to column 1 of array 30 in FIG. 1 which corresponds to delay element 350_1 in FIG. 5. The column-fill operation is carried out and after a latency of $T_L$ seconds the packets selected for transmission to the output ports appear at output $O_{11}$. At the same time, the remaining packets appear at output $O_{21}$ for another column-fill operation with the next module 300_2. Each time a packet enters a delay element its age field is decremented by one, unless the age field is already zero. The process is continued until module 300_B-1 which offers the remaining input packets to the last module.

The last module 300_B in FIG. 5 for each destination selects the highest priority packets from both inputs $I_{1B}$ and $I_{2B}$, and then forwards them to the (B-1)th module. The remaining packets are recirculated through its delay element for contention in the next time slot. Any excess packets that cannot be accommodated in the last module will be dropped.

Figure 6:
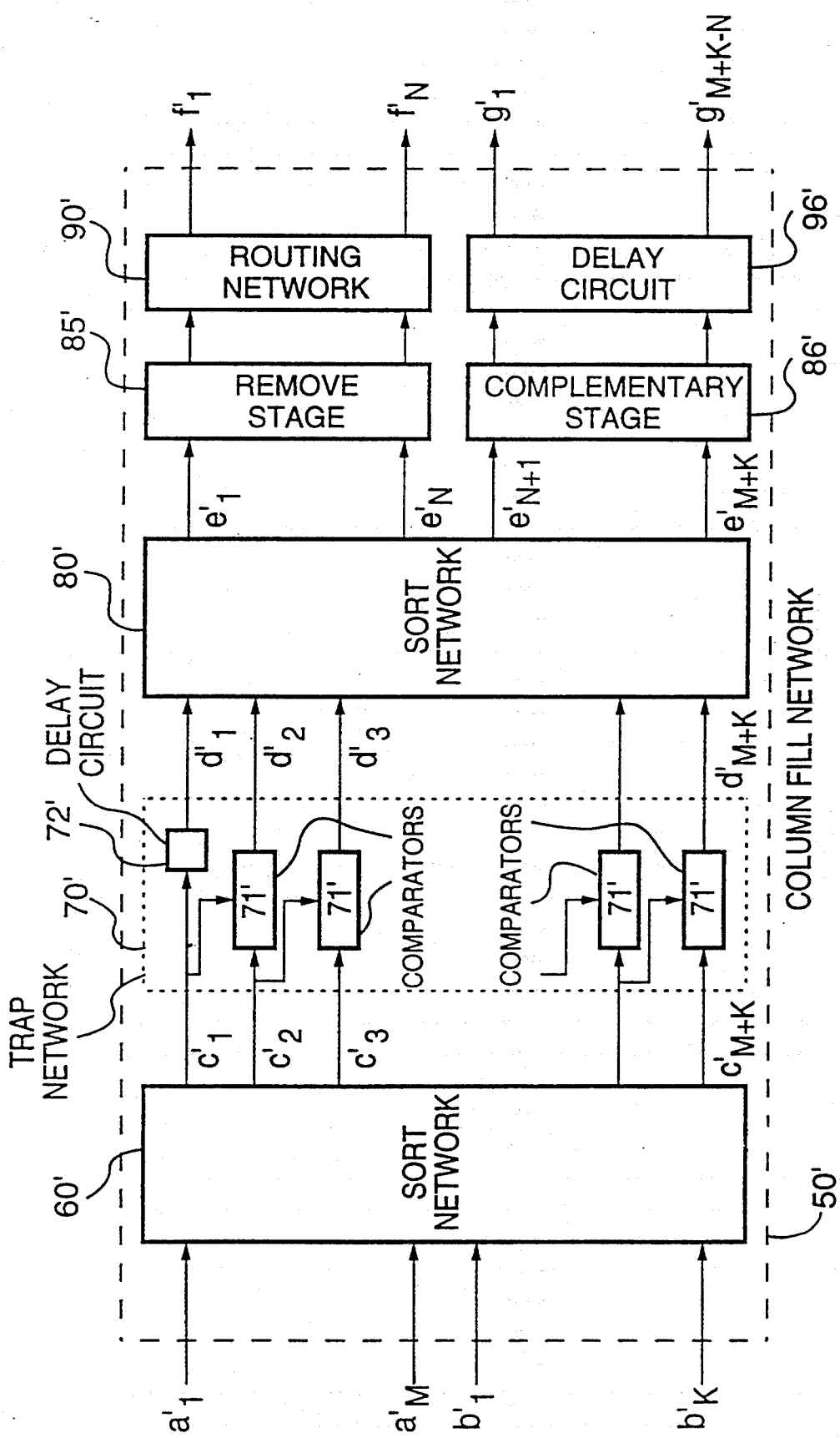
FIG. 6 is a block diagram of a generalized column-fill network wherein the shared buffer module of FIG. 5 differs from the column-fill modules in that the size of the input column and array column need not necessarily be the same as those at the output.

Packets are dropped in the following way. FIG. 6 shows that th shared buffer module can differ from a column-fill module in that the size of the input column and array column are not necessarily the same as those at the output. The sort network 60' sorts the packets $a_1', a_2', \ldots, a_M'$ and $b_1', b_2', \ldots, b_K'$ in ascending order according to split bit (which is set to zero), activity bit, destination address bits, priority bits, and age bits to produce the packets $c_1', c_2', \ldots, c_{M+K}'$. The trap network 70' operates in the same manner as trap network 70 in FIG. 3. The Sort network 80' operates as follows: first the packets $d_1', d_2', \ldots, d_{M+K}'$ are sorted to produce a circular bitonic list of packets $e_1', e_2', \ldots, e_N, e_{N+1}, \ldots e_{M+K}'$ in which packets with the prefix 00 appear first in increasing order of destination address, followed by the empty packets with the prefix 01, followed finally by packets with the prefix 10, in decreasing order of original destination address. It is possible for packets with index 10 to appear in the lower part of $e_1', e_2', \ldots, e_N'$ which in the normal column-fill network would he transferred to the delay element. The remove stage 85' replaces all packets with split bit equal to one with empty packets, and forwards these packets to a banyan routing network 90'. This requires changing the split bit to zero and the activity bit to one. Packets with the prefix 10 that are replaced by empty packets are lost. The packets $f_1', f_2', \ldots, f_n'$ are then forwarded to column-fill network B-1. The complement stage 86' sets the split bit to zero, and complements the destination, priority, and age fields to recover the original destination addresses, and forwards the packets to the delay circuit 96'. The resulting packets $g_1', g_2', \ldots, g_{M+K-N}'$ form the array column that constitutes the shared buffer because packets may have repeated addresses. When $K=N$ all the lines from the delay circuit 96' are connected to the input of module B. When K is greater than N, packets $g_1', \ldots, g_{K-N}'$ in FIG. 6 are lost, and packets $g_{K-N+1}', g_{K-N+2}' \ldots, g_{M+K-N}'$ are recirculated back to the input $a_M', a_{M-1}', \ldots, a_1'$ of sort network 60'. Note that the bottom output line from delay network 96' is connected to the top input line of sort network 60'. When K is less than N, packets $g_{M+K-N}', \ldots, g_1'$ in FIG. 6 are recirculated back to inputs $a_1', \ldots, a_{M+K-N}'$ of sort network 60', and empty packets are input into $a_{M+K-N+1}', \ldots, a_M'$.

Figure 7:
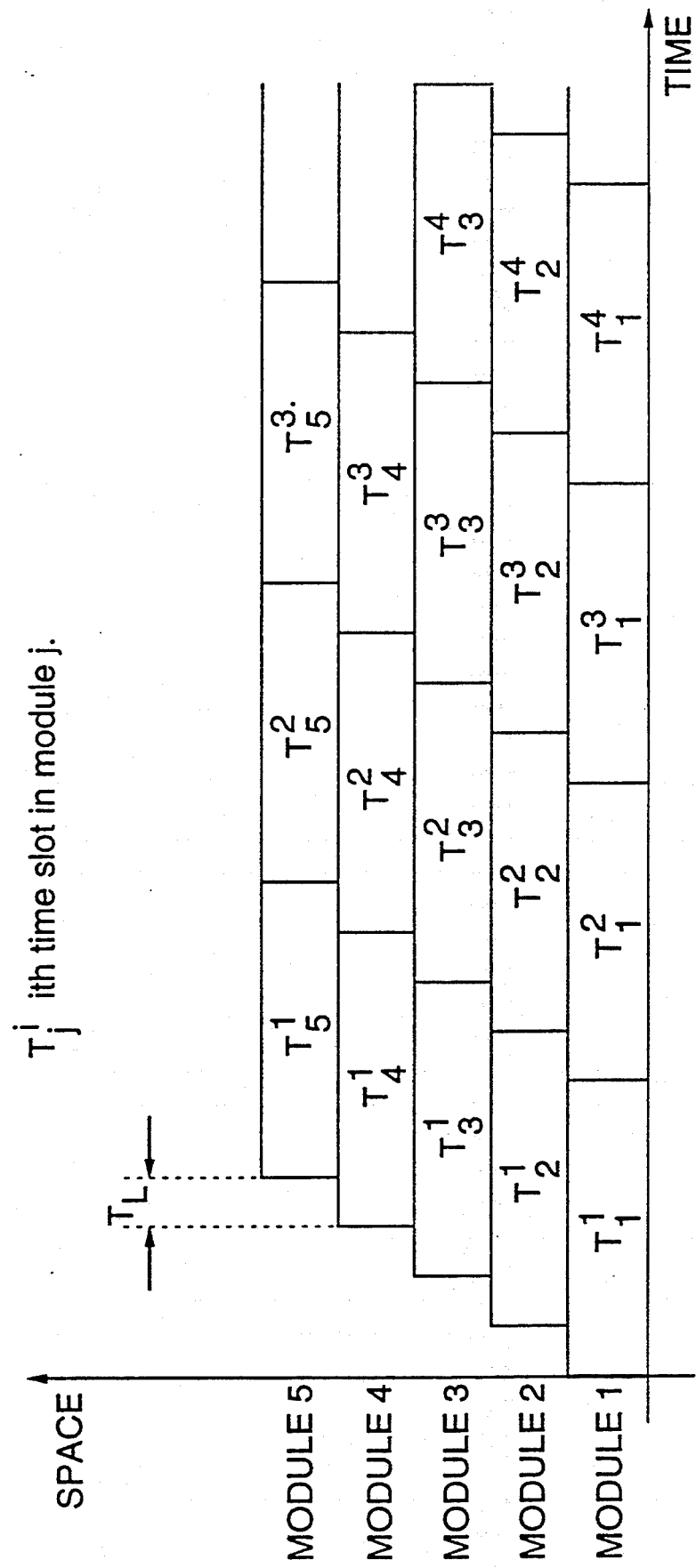
FIG. 7 is a space-time diagram depicting the overlapped time slots for the packets switched by the architecture of FIG. 5.

Since a fixed delay, say $T_L$, is incurred traversing a module, the time slots among the modules have to be staggered. FIG. 7 shows the space-time diagram of the staggered operation of the switching modules.

The switch according to the preferred embodiment of FIG. 5 implements the required column-fill operation during the first B-1 modules, thus implementing an output buffered switch with B-1 buffers dedicated to each output port. The last module implements buffer sharing.

Figure 1B:
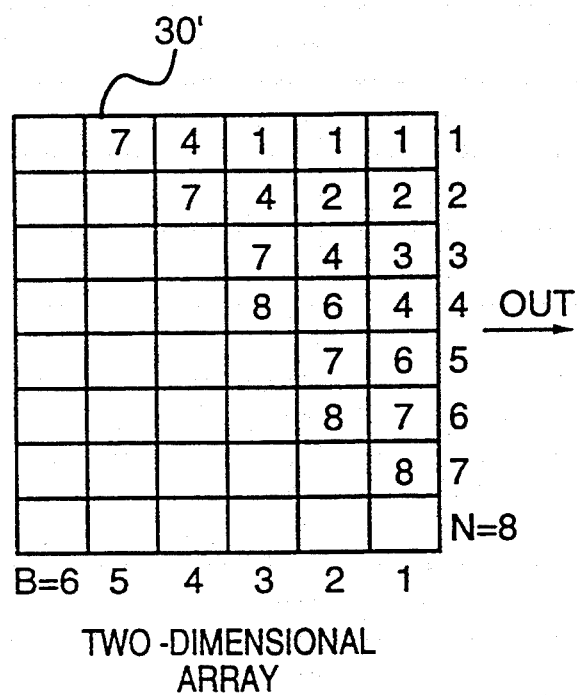
FIG. 1b is a schematic representation showing operation of an output buffered switch with streamlined column-fill networks, according to the present invention.

When the switch in FIG. 5 uses streamlined column-fill networks, the presorting network 200 and the routing network 400 are required. The presorting network accepts K incoming packets and sorts them in ascending order based on the packet header values. In order to present a circular bitonic list to the first streamlined column-fill network, it is necessary to connect the outputs of the presorting network 200 to inputs of the streamlined column-fill $I_{21}$ in reverse order. The streamlined column-fill networks then operate as desired in modules 1 up to B-1. The output packets from $O_{11}$ in the first module are routed to their appropriate destination output ports by the routing network 400. This routing network can be implemented using a banyan routing network. When streamlined column-fill networks are used, the shared buffer module B can also be simplified. The routing network 90' and the delay circuit 96' in FIG. 6 can be omitted. The resulting outputs are connected to module B-1 and to the input of module B in the same manner as above. The inputs to the column-fill network in module B now form a circular bitonic list so sort network 60' can be replaced by a banyan sorting network. When using streamlined column-fill networks packets are stored in the delay elements in FIG. 5 as shown in FIG 1b.

The trap network 70' and the sort network 80' in FIG. 6 can also be simplified by replacing them with a modified trap network, a running adder network and a reverse banyan network. The modified trap network performs as above except that the bit complement operation is omitted. The running adder network uses the results of the comparator circuits to produce the circular bitonic list $e_1', e_2', \ldots, e_N', e_{N+1}', \ldots e_{M+K}'$. The remove stage 85' replaces all packets with split bit equal to one with empty packets. The complement stage 86' is not required.

A switch is said to maintain packet sequence if packets belonging to each input-output port combination and within the same priority class exit the switch in the same order as they enter, except for possible "gaps" at the output due to packet loss. To see how packet sequence is maintained within the same priority class, one may consider the situation where an input packet destined for a particular output enters the first module 300—1 in FIG. 5. If there is a packet destined for the same output in the delay element of the first module, then the sort network 60 in FIG. 3 will place the packet from the delay element 350—1 in FIG. 5 on a higher output line than the input packet. This is because the packet from the delay element has a lower age value (i.e. has been present in the switch longer). Whenever the outputs of the sort network 60 in FIG. 3 contain duplicates, the column-fill network 310—1 in FIG. 5 sends the packet located at the highest line to $O_{11}$, and the rest to $O_{21}$. In this example, the (old) packet from the delay element 350—1 will be transmitted to the routing network 400 if any while the other (new) packet will be sent to the second module 300—2 to undergo another column-fill process. If there is another packet with the same output address found in the second module, that packet will be forwarded to the first module 300—1 while the new packet will be forwarded to the third module 300—3. Hence, this new packet must wait until all previous packets with the same address have exited the switch before it can be transmitted out. Therefore, packet sequencing is guaranteed as long as the age value does not reach zero.

Figure 8:
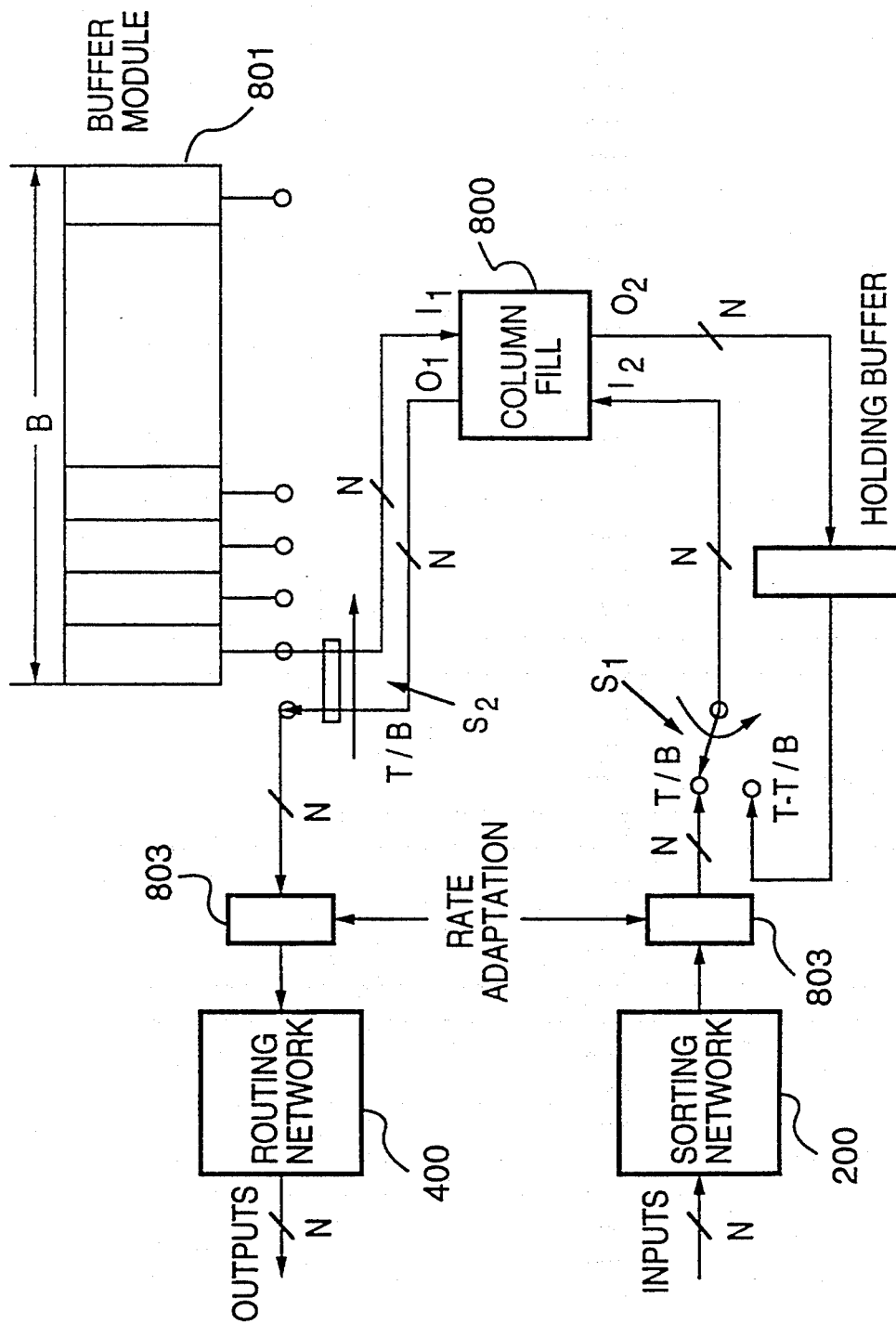
FIG. 8 is a block diagram of a time sharing switch architecture according to an alternative embodiment of the present invention.

The basic switch architecture of the preferred embodiment shown in FIG. 5 consists of multiple identical modules connected in series. One contemplated alternative embodiment of the invention utilizes only one column-fill network 800 and uses time sharing as shown in FIG. 8. The presorter 200 and the routing network 400 still run at the same speed as the external clock rate, consistent with the preferred embodiment of FIG. 5. However, the column-fill network 800 is adapted to run B times faster than any one of the networks 310—1 to 310—B in the preferred embodiment, where B is the depth of the buffer module. A buffer module 801 is used to store the results of successive column-fill operations as performed by successive ones of the modules 300—1 to 300—B in the embodiment of FIG. 5. A holding buffer 802 is used to temporarily hold residual input packets for processing in the column-fill network 800 (ie. corresponding to the packets applied to the inputs $I_{22}$ to $I_{2B}$ in the preferred embodiment). In the embodiment shown, it is assumed that the shared memory delay element (the rightmost element in 801) and holding buffer 802 are also of size N.

Suppose the duration of a time slot at the external rate is T sec. Then at the beginning of every time slot, $S_1$ connects to its upper pole for T/B seconds. Note that the rate adaptation circuit 803 is necessary to provide rate matching between the external rate and the column-fill network rate. At this point $S_2$ is in the position such that the packets in the leftmost element 801 with unique addresses will be sent to the routing network (as shown in FIG. 8). During the next T-T/B sec., $S_1$ connects to the lower pole. $S_2$ slides to the next storage element on the right, each for T/B sec. The column-fill operation is executed at this phase. At the end of a time slot, $S_1$ moves back the upper pole, $S_2$ returns to the far left, and the whole process repeats.

As an alternative time sharing of a single column-fill network 800, when the column-fill network operates at B/n times faster then n synchronized column-fill networks may be used.

In traditional stored program control telephone switching the switch fabric control and the information transfer parts are separate. A central control sets the connections required to effect the flow of information from the input of the switch to the output. The packet switch architecture presented above does not follow this approach in that the control and transfer are realized by the same hardware. This involves inefficient use of resources much like in-band signalling is inefficient relative to out-of-band signalling is telephone networks. According to a further embodiment of the invention, a packet switch is provided which separates the control and packet transfer functions.

Figure 9:
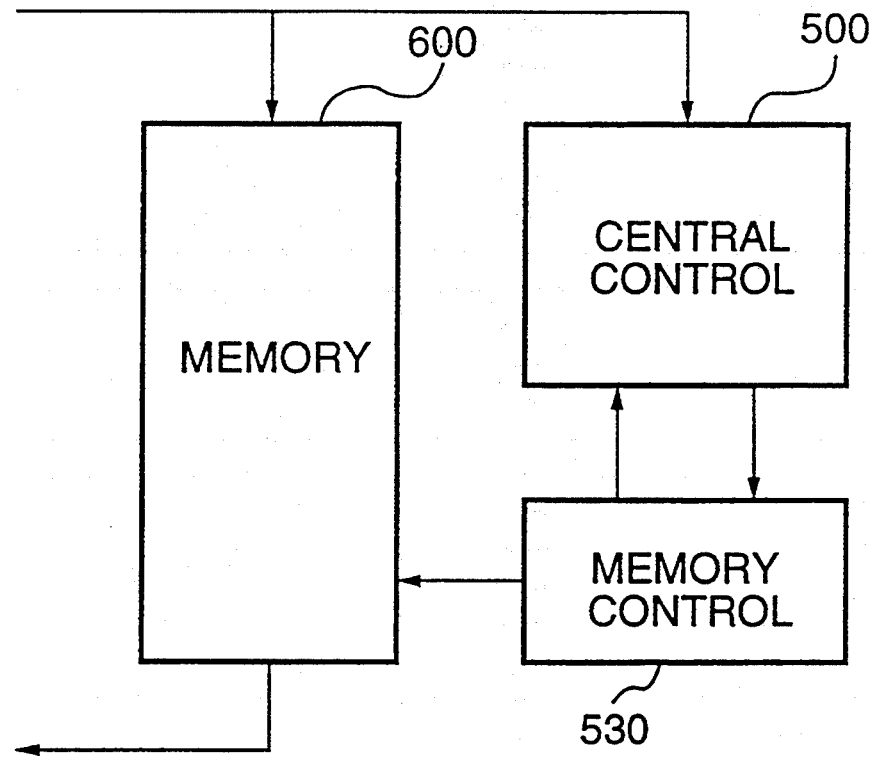
FIG. 9 shows a packet switch architecture with centralized control according to a further alternative embodiment.

FIG. 9 shows a packet switch architecture with centralized control 500. Packets that arrive from the switch interface are stored in memory 600. Henceforth, such packets will be referred to as full packets. The memory location of a full packet is appended to a replica of its header to create a new minipacket. An input column consisting of minipackets is offered to central control 500 which consists of the packet switch with the preferred architecture shown in FIG. 5. The output of the central control 500 is a column of minipackets specifying the locations of the full packets that are to be transmitted at a given time slot. These output columns of minipackets are used to control the reading out of packets to the output of the packet switch by memory controller 530. In order to operate synchronously with the input packets, the central control needs to produce one output column per full packet transmission time, i.e. one time slot. If R is the ratio of the number of bits in a full-packet to those in a minipacket, then the packet switch 510 (see FIG. 10) inside the central control 500 can operate R times slower than the switch input line speed.

Figure 10:
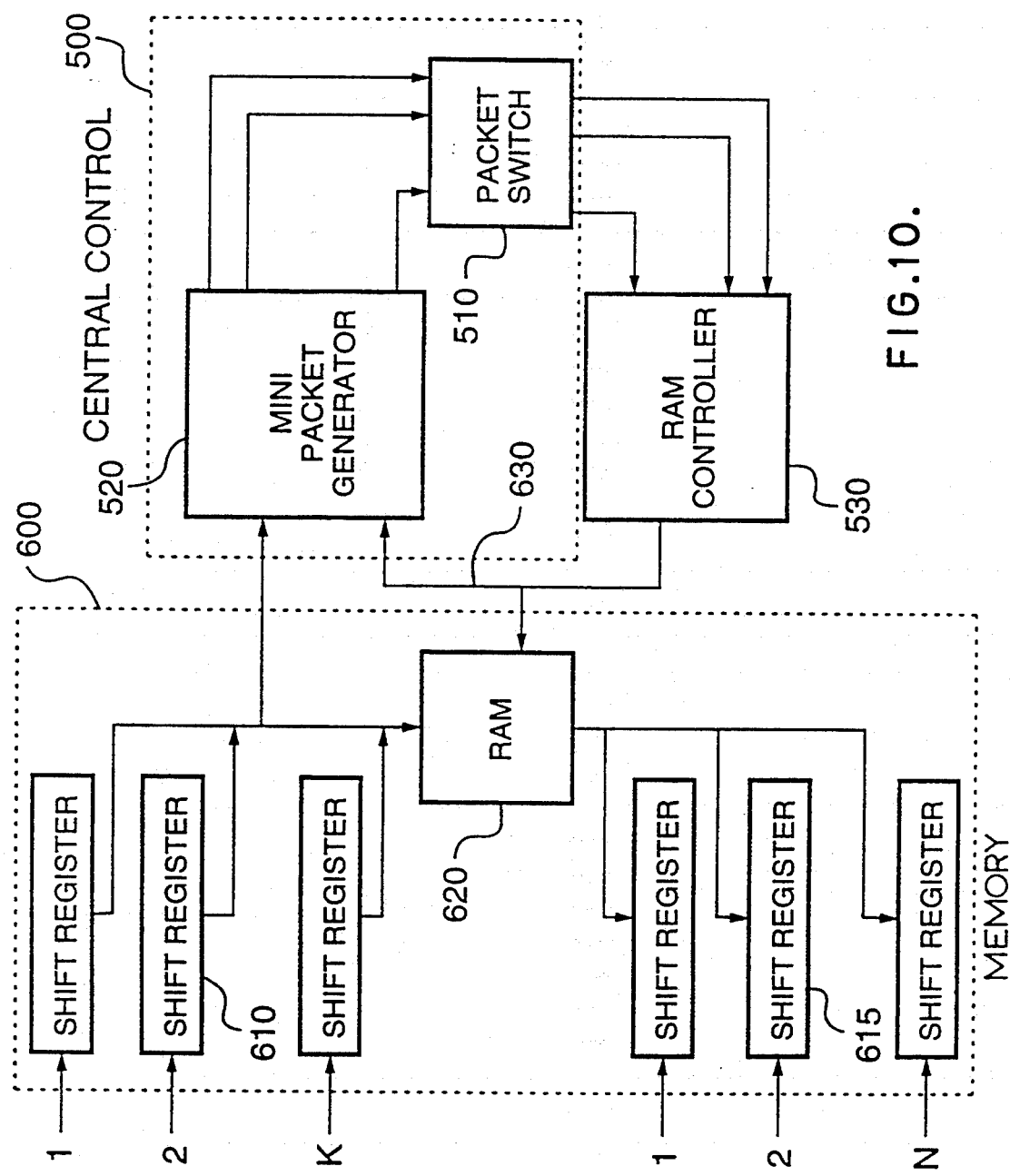
FIG. 10 shows an embodiment of the packet switch architecture of FIG. 9.

FIG. 10 shows a possible embodiment of the memory structure 600. Incoming full packets on K input lines are first shifted into the shift registers 610. Each shift register 610 stores one full packet. The input full packets are written to a central random access memory 620 sequentially one at a time, and the corresponding address location is produced on line 630 and copies to the minipacket corresponding to that line. This particular embodiment requires that full packets are offered to the memory input in staggered fashion, with each packet being staggered by the full packet length divided by K. During each time slot, the central control 500 produces a column of minipackets via minipacket generator 520 that are used to select the address of the memory locations of the full packets that are to be read out. The memory controller 530 supplies the locations to the RAM 620 so that the full packets can be retrieved and read out one packet at a time. The packets are read out in staggered fashion to an output interface comprising shift registers 615, which aligns the packets for synchronous transmission if necessary.

Other alternative embodiments and variations of the invention are possible within the sphere and scope of the claims appended hereto.

We claim:

1. A central control switch for switching an input column of data packets having predetermined destination addresses and predetermined priority values, comprising:

a) memory means for receiving and storing said input column of data packets at memory locations defined by predetermined memory addresses, and in response outputting said memory addresses;

b) a central control connected to said memory means, said central control for receiving said memory addresses and header data corresponding to said memory addresses, respectively, and in response generating a column of output minipackets for specifying the locations of said data packets to be output at a predetermined time;

c) a memory controller connected to said memory means and said central control for reading out said data packets from said memory means in accordance with data contained in said output minipackets, wherein said central control further comprises:

d) a minipacket generator connected to said memory means for receiving said header data from said input data packets and said memory addresses of said data packets and in response generating a column of minipackets; and e) a packet switch connected to said minipacket generator for receiving and switching said column of minipackets according to said header data and in response transmitting said output minipackets to said memory controller.

2. The central control switch of claim 1, wherein said memory means further comprises:

a) a plurality of input shift registers for storing successive ones of said data packets;

b) a random access memory for sequentially reading said successive ones of said data packets from respective ones of said shift registers and simultaneously outputting said memory addresses to said central control, and outputting predetermined ones of said data packets upon receipt of said data contained in said minipackets; and c) a plurality of output shift registers for receiving and shifting out said data packets output from said random access memory.

3. The central control switch of claim 1, wherein said packet switch further comprises:

a) a plurality of switch input lines for receiving a column of switch input minipackets having predetermined destination addresses and predetermined priority values;

b) a plurality of switch output lines for transmitting a column of switch output minipackets having associated destination addresses in corresponding ones of said output lines;

c) a predetermined number of series connected modules, each of said modules comprising storage locations which are either empty or which store minipackets corresponding to a column of an array wherein each of said minipackets have associated destination addresses in corresponding row entries of said array;

d) means within a first module for:

i) receiving from the switch input lines a column of input minipackets having predetermined destination addresses and predetermined priority values;

ii) routing out to the switch output lines an output array column in which each row entry contains the highest priority minipacket with the associated destination address from a combined set of minipackets contained in the column of input minipackets and said storage locations associated with said first module;

iii) shifting out to an adjacent one of said modules a new input column consisting of all remaining minipackets from said combined set; and iv) shifting in to the storage locations associated with said first module a further column of minipackets from said adjacent one of said modules; and e) means within remaining successive modules for:
i) receiving from a preceding module said new input column of minipackets having predetermined destination addresses and predetermined priority values;

ii) routing out to the preceding module a new output array column in which each row entry contains the highest priority minipacket with the associated destination address from a further combined set of minipackets contained in said new input column and said storage locations associated with respective ones of said remaining successive modules;

iii) shifting out a further new input column consisting of all remaining minipackets from said further combined set; and iv) shifting into said storage locations associated with respective ones of said remaining successive modules said new output array column from any succeeding module.

4. The central control switch of claim 3, wherein each of said modules further includes:

a) a generalized column-fill network connected to said storage locations associated with each of said modules for receiving minipackets denoted as $a_1, a_2, \ldots, a_N$, wherein $a_N$ corresponds to the Nth entry of said storage locations associated with each of said modules, and further minipackets denoted as $b_1, b_2, \ldots, b_k$, where $b_k$ corresponds to the kth entry of any one of said column of input minipackets, said new input column of minipackets, and said further new input column, and in response generating minipackets denoted as $f_1, f_2, \ldots, f_N$ for output as any one of either said new input column of minipackets and said further new input column, and generating minipackets denoted as $g_1, g_2, \ldots, g_k$ for output to as any one of either said output column, said new output array column, or said further new output array column, wherein each of said minipackets $a_1, a_2, \ldots, a_N$ and $b_1, b_2, \ldots, b_k$ includes:

a split bit which is initially set to zero, an activity bit which is set to zero in the event the minipacket contains data and is set to one in the event the minipacket contains no data;

a plurality of address bits defining an output address to which the minipacket is destined;

a plurality of priority bits for identifying said predetermined priority value in terms of a predetermined class of service of said minipacket; and a plurality of age bits for maintaining sequence within each priority class of service; and b) means for initiating each of said age bits for each of said switch input minipackets that contain data, and means for decrementing said age bits of each of said minipackets that contain data by one, unless said age bits are all zero, upon shifting in of each of said minipackets that contain data into any one of said storage locations, wherein said generalized column-fill network further comprises:

i) a first sort network for receiving and sorting the minipackets $a_1, a_2, \ldots, a_N$ and $b_1, b_2, \ldots, b_k$ in ascending order according to said split bit, activity bit, address bits, priority bits, and age bits, and in response generating intermediate minipackets $c_1, c_2, \ldots, c_{N+K}$;

ii) a trap network for receiving and comparing successive pairs of said intermediate minipackets $c_1, c_2, \ldots, c_{N+K}$ and in response generating a further plurality of minipackets $d_1, d_2, \ldots, d_{N+K}$, wherein said trap network comprises a plurality of comparators for comparing the address bits of said successive pairs of said intermediate minipackets $c_1, c_2, \ldots, c_{N+K}$, each minipacket $c_{j+1}$ having associated therewith one of said comparators having a pair of inputs $c_j$ and $c_{j+1}$ such that when one of said comparators determines that two addresses are the same, the split bit of the minipacket associated with said one of said comparators is set to one, the activity bit is left at zero, and said address, priority, and age bits are complemented, whereby the resulting minipacket begins with the bits "10", and when said one of said comparators determines that two addresses are different, the associated minipacket is identified as the first occurrence of a particular destination address in the sequence $c_1, c_2, \ldots, c_{N+K}$, the split bit is left at zero, and all other header bits are left unchanged, whereby the resulting minipacket begins with the bits "00", and the first two bits of any minipacket which contains no data are "01" since the split bit is left at zero in such minipackets;

iii) a second sort network for sorting said minipackets $d_1, d_2, \ldots, d_{N+K}$ according to said split bit, activity bit, destination address bits, priority bits, and age bits, and in response generating a plurality of sorted minipackets $e_1, e_2, \ldots, e_{N+K}$, in which the split bit for each of said minipackets $e_1, e_2, \ldots, e_{N+K}$ is reset to zero, and in which the address bits, priority bits, and age bits of all minipackets having said split bits set to one of said minipackets $d_1, d_2, \ldots, d_{N+K}$ are complemented in order to recover said destination address bits, priority bits and age bits thereof which were previously complemented, and wherein predetermined ones of said minipackets $d_1, d_2, \ldots, d_{N+K}$ having a split bit of zero and an activity bit of zero appear first in $e_1, e_2, \ldots, e_{N+K}$ in increasing order of destination address, followed by predetermined ones of said minipackets $d_1, d_2, \ldots, d_{N+K}$ with no data and a split bit of zero and activity bit of one, followed finally by further predetermined ones of said minipackets $d_1, d_2, \ldots, d_{N+K}$ having a split bit of one and an activity bit of zero, in decreasing order of destination address;

iv) a non-blocking routing network for re-ordering minipackets $e_1, e_2, \ldots, e_N$ according to destination address and in response generating said output minipackets $f_1, f_2, \ldots, f_N$; and v) a delay circuit for delaying minipackets $e_{N+1}, e_{N+2}, \ldots, e_{N+K}$ and in response generating said output minipackets $g_1, g_2, \ldots, g_k$ simultaneously with generation of said output minipackets $f_1, f_2, \ldots, f_N$.

5. The central control switch of claim 4, wherein said non-blocking routing network is a banyan network.

6. The central control switch of claim 4, wherein said first sort network is a Batcher network.

7. The central control switch of claim 4, wherein the said second sort network is a Batcher network.

8. The central control switch of claim 3, wherein each of said modules further includes:
   a) a generalized column-fill network connected to said storage locations associated with each of said modules for receiving minipackets denoted as $a_1$, $a_2, \ldots, a_N$, wherein $a_n$ corresponds to the nth entry of said storage locations associated with each of said modules, and further minipackets denoted as $b_1, b_2, \ldots, b_k$ where $b_k$ corresponds to the kth entry of any one of said column of input minipackets, said new input column of minipackets, and said further new input column, and in response generating minipackets denoted as $f_1, f_2 \ldots, f_N$ for output as any one of either said new input column of minipackets and said further new input column, and generating minipackets denoted as $g_1, g_2, \ldots, g_k$ for output as any one of either said output column, said new output array column, or said further new output array column, wherein each of said minipackets $a_1, a_2, \ldots, a_N$ and $b_1, b_2, \ldots, b_k$ includes:
   a split bit which is initially set to zero;
   an activity bit which is set to zero in the event the minipacket contains data and is set to one in the event the minipacket contains no data;
   a plurality of address bits defining an output address to which the minipacket is destined;
   a plurality of priority bits for identifying said predetermined priority value in terms of a predetermined class of service of said minipacket; and
   a plurality of age bits for maintaining sequence within each priority class of service; and
   b) means for initiating each of said age bits for each of said switch input minipackets that contain data, and means for decrementing said age bits of each of said minipackets that contain data by one, unless said age bits are all zero, upon shifting in of each of said minipackets that contain data into any one of said storage locations,
   wherein said generalized column-fill network further comprises:
   i) a sort network for receiving and sorting the minipackets $a_1, a_2, \ldots, a_N$ and $b_1, b_2, \ldots, b_k$ in ascending order according to said split bit, activity bit, address bits, priority bits, and age bits, and in response generating intermediate minipackets $c_1, c_2, \ldots, c_{N+K}$;
   ii) a modified trap network for receiving and comparing successive pairs of said intermediate minipackets $c_1, c_2, \ldots, c_{N+K}$ and in response generating a further plurality of minipackets $d_1, d_2, \ldots, d_{N+K}$, wherein said modified trap network comprises a plurality of comparators for comparing the address bits of said successive pairs of said intermediate minipackets $c_1, c_2, \ldots, c_{N+K}$ each minipacket $c_{j+1}$ having associated therewith one of said comparators having a pair of inputs $c_j$ and $c_{j+1}$ such that when one of said comparators determines that two addresses are the same, the split bit of the minipacket associated with said one of said comparators is set to one, the activity bit is left at zero, whereby the resulting minipacket begins with the bits "10", and when said one of said comparators determines that two addresses are different, the associated minipacket is identified as the first occurrence of a particular destination address in the sequence $c_1, c_2, \ldots, c_{N+K}$ the split bit is left at zero, and all other header bits are left unchanged, whereby the resulting minipacket begins with the bits "00", and the first two bits of any minipacket which contains no data are "01" since the split bit is left at zero in such minipackets;
   iii) a running adder and reverse banyan network for sorting said minipackets $d_1, d_2, \ldots, d_{N+K}$ according to said split bit, activity bit, destination address bits, priority bits, and age bits and in response generating a plurality of sorted minipackets $e_1, e_2, \ldots, e_{N+K}$, in which the split bit for each of said minipackets $e_1, e_2, \ldots, e_{N+K}$ is reset to zero, and wherein predetermined ones of said minipackets $d_1, d_2, \ldots, d_{N+K}$ having a split bit of zero and an activity bit of zero appear first in $e_1, e_2, \ldots, e_{N+K}$ in increasing order of destination address, followed by predetermined ones of said minipackets $d_1, d_2, \ldots, d_{N+K}$ with no data and a split bit of zero and activity bit of one, followed finally by further predetermined ones of said minipackets $d_1, d_2, \ldots, d_{N+K}$ having a split bit of one and an activity bit of zero, in decreasing order of destination address;
   iv) a non-blocking routing network for re-ordering minipackets $e_1, e_2, \ldots, e_N$ according to destination address and in response generating said output minipackets $f_1, f_2, \ldots, f_N$; and
   v) a delay circuit for delaying minipackets $e_{N+1}$, $e_{N+2}, \ldots, e_{N+K}$ and in response generating said output minipackets $g_1, g_2, \ldots, g_k$ simultaneously with generation of said output minipackets $f_1, f_2, \ldots, f_N$.

9. The central control switch of claim 8, wherein said non-blocking routing network is a banyan network.

10. The central control switch of claim 8, wherein said sort network is a Batcher network.

11. The central control switch of claim 1, wherein said packet switch further comprises:
   a) a plurality of switch input lines for receiving a column of switch input minipackets having predetermined destination addresses and predetermined priority values;
   b) a presorting network for sorting said column of switch input minipackets in ascending order according to said predetermined destination addresses and in response generating a presorted input column;
   c) a plurality of switch output lines for transmitting a column of switch output minipackets having associated destination addresses in corresponding ones of said output lines;
   d) an output routing network for placing an output array column of minipackets on the said plurality of switch output lines;
   e) a predetermined number of series connected modules, each of said modules comprising storage locations which are either empty or which store minipackets corresponding to a column of an array wherein each of said minipackets have different destination addresses;
   f) means within a first module for:
   i) receiving the said presorted input column;

ii) routing out to the said output routing network the said output array column of minipackets which for each destination address contains the highest priority minipacket from a combined set of minipackets contained in the column of input minipackets and said storage locations associated with said first module;

iii) shifting out to an adjacent one of said modules a new input column consisting of all remaining minipackets from said combined set; and iv) shifting in to the storage locations associated with said first module a further column of minipackets from said adjacent one of said modules; and g) means within remaining successive modules for:

i) receiving from a preceding module said new input column of minipackets having predetermined destination addresses and predetermined priority values;

ii) routing out to the preceding module a new output array column which for each destination address contains the highest priority minipacket from a further combined set of minipackets contained in said new input column and said storage locations associated with respective ones of said remaining successive modules;

iii) shifting out a further new input column consisting of all remaining minipackets from said further combined set; and iv) shifting into said storage locations associated with respective ones of said remaining successive modules said new output array column from any succeeding module.

12. The central control switch of claim 11, wherein each of said modules further includes:

a) a streamlined column-fill network connected to said storage locations associated with each of said modules for receiving minipackets denoted as $a_1, a_2, \ldots, a_N$ wherein $a_N$ corresponds to the Nth entry of said storage locations associated with each of said modules, and further minipackets denoted as $b_1, b_2, \ldots, b_k$ where $b_k$ corresponds to the kth entry of any one of said column of input minipackets, said new input column of minipackets, and said further new input column, and in response generating minipackets denoted as $f_1, f_2, \ldots, f_N$ for output as any one of either said new input column of minipackets, and said further new input column and generating minipackets denoted as $g_1, g_2, \ldots, g_k$ for output as any one of either said output column, said new output array column or said further new output array column, wherein each of said minipackets $a_1, a_2, \ldots, a_N$ and $b_1, b_2, \ldots, b_k$ includes:

a split bit which is initially set to zero, an activity bit which is set to zero in the event the minipacket contains data and is set to one in the event the minipacket contains no data;

a plurality of address bits defining an output address to which the minipacket is destined;

a plurality of priority bits for identifying said predetermined priority value in terms of a predetermined class of service of said minipacket; and a plurality of age bits for maintaining sequence within each priority class of service; and b) means for initiating each of said age bits for each of said switch input minipackets that contain data, and means for decrementing said age bits of each of said minipackets that contain data by one, unless said age bits are all zero, upon shifting in of each of said minipackets that contain data into any one of said storage locations, wherein said streamlined column-fill network further comprises:

i) a first sort network for receiving and sorting the minipackets $a_1, a_2, \ldots, a_N$ and $b_1, b_2, \ldots, b_k$ in ascending order according to said split bit, activity bit, address bits, priority bits, and age bits, and in response generating intermediate minipackets $c_1, c_2, \ldots, c_{N+K}$;

ii) a trap network for receiving and comparing successive pairs of said intermediate minipackets $c_1, c_2, \ldots, c_{N+K}$ and in response generating a further plurality of minipackets $d_1, d_2, \ldots, d_{N+K}$, wherein said modified trap network comprises a plurality of comparators for comparing the address bits of said successive pairs of said intermediate minipackets $c_1, c_2, \ldots, c_{N+K}$ each minipacket $c_{j+1}$ having associated therewith one of said comparators having a pair of inputs $c_j$ and $c_{j+1}$ such that when one of said comparators determines that two addresses are the same, the split bit of the minipacket associated with said one of said comparators is set to one, the activity bit is left at zero, and said address, priority, and age bits are complemented, whereby the resulting minipacket begins with the bits "10", and when said one of said comparators determines that two addresses are different, the associated minipacket is identified as the first occurrence of a particular destination address in the sequence $c_1, c_2, \ldots, c_{N+K}$ the split bit is left at zero, and all other header bits are left unchanged, whereby the resulting minipacket begins with the bits "00", and the first two bits of any minipacket which contains no data are "01" since the split bit is left at zero in such minipackets; and iii) a second sort network for sorting said minipackets $d_1, d_2, \ldots, d_{N+K}$ according to said split bit, activity bit, destination address bits, priority bits, and age bits and in response generating said output minipackets $e_1, e_2, \ldots, e_{N+K}$ in which the split bit for each of said minipackets $e_1, e_2, \ldots, e_{N+K}$ is reset to zero, and in which the address bits, priority bits, and age bits of all minipackets having said split bits set to one of said minipackets $d_1, d_2, \ldots, d_{N+K}$ are complemented in order to recover said destination address bits, priority bits and age bits thereof which were previously complemented, and wherein predetermined ones of said minipackets $d_1, d_2, \ldots, d_{N+K}$ having a split bit of zero and an activity bit of zero appear first in $e_1, e_2, \ldots, e_{N+K}$ in increasing order of destination address, followed by predetermined ones of said minipackets $d_1, d_2, \ldots, d_{N+K}$ with no data and a split bit of zero and activity bit of one, followed finally by further predetermined ones of said minipackets $d_1, d_2, \ldots, d_{N+K}$ having a split bit of one and an activity bit of zero, in decreasing order of destination address.

13. The central control switch of claim 12, wherein said first sort network further comprises a banyan network whose nodes are 2×2 sorters.

14. The central control switch of claim 12, wherein said first sort network further comprises a Batcher network.

15. The central control switch of claim 12, wherein said second sort network comprises a Batcher network.

16. The central control switch of claim 12, wherein said presorting network further comprises a Batcher network.

17. The central control switch of claim 12, wherein said output routing network further comprises a banyan network.

18. The central control switch of claim 11, wherein each of said modules further includes:
   a) a streamlined column-fill network connected to said storage locations associated with each of said modules for receiving minipackets denoted as $a_1, a_2, \ldots, a_N$ wherein $a_N$ corresponds to the Nth entry of said storage locations associated with each of said modules, and further minipackets denoted as $b_1, b_2, \ldots, b_k$, where $b_k$ corresponds to the kth entry of any one of said column of input minipackets, said new input column of minipackets, and said further new input column, and in response generating minipackets denoted as $f_1, f_2, \ldots, f_N$ for output as any one of either said new input column of minipackets, and said further new input column and generating minipackets denoted as $g_1, g_2 \ldots, g_k$ for output as any one of either said output column, said new output array column or said further new output array column, wherein each of said minipackets $a_1, a_2, \ldots, a_N$ and $b_1, b_2, \ldots, b_k$, includes:
   a split bit which is initially set to zero, an activity bit which is set to zero in the event the minipacket contains data and is set to one in the event the minipacket contains no data;
   a plurality of address bits defining an output address to which the minipacket is destined;
   plurality of priority bits for identifying said predetermined priority value in terms of a predetermined class of service of said minipacket; and
   a plurality of age bits for maintaining sequence within each priority class of service; and
   b) means for initiating each of said age bits for each of said switch input minipackets that contain data, and means for decrementing said age bits of each of said minipackets that contain data by one, unless said age bits are all zero, upon shifting in of each of said minipackets that contain data into any one of said storage locations,
   wherein said streamlined column-fill network further comprises:
   i) a first sort network for receiving and sorting the minipackets $a_1, a_2, \ldots, a_N$ and $b_1, b_2, \ldots, b_k$, in ascending order according to said split bit, activity bit, address bits, priority bits, and age bits, and in response generating intermediate minipackets $c_1, c_2, \ldots, c_{N+K}$;
   ii) a modified trap network for receiving and comparing successive pairs of said intermediate minipackets $c_1, c_2, \ldots, c_{N+K}$ and in response generating a further plurality of minipackets $d_1, d_2, \ldots, d_{N+K}$, wherein said modified trap network comprises a plurality of comparators for comparing the address bits of said successive pairs of said intermediate minipackets $c_1, c_2, \ldots, c_{N+K}$, each minipacket $c_{j+1}$ having associated therewith one of said comparators having a pair of inputs $c_j$ and $c_{j+1}$ such that when one of said comparators determines that two addresses are the same, the split bit of the minipacket associated with said one of said comparators is set to one, the activity bit is left at zero, whereby the resulting minipacket begins with the bits "10", and when said one of said comparators determines that two addresses are different, the associated minipacket is identified as the first occurrence of a particular destination address in the sequence $c_1, c_2, \ldots, c_{N+K}$ the split bit is left at zero, and all other header bits are left unchanged, whereby the resulting minipacket begins with the bits "00", and the first two bits of any minipacket which contains no data are "01" since the split bit is left at zero in such minipackets; and
   iii) a running adder and reverse banyan network for sorting said minipackets $d_1, d_2, \ldots, d_{N+K}$ according to said split bit, activity bit, destination address bits, priority bits, and age bits, and in response generating a plurality of sorted minipackets $e_1, e_2, \ldots, e_{N+K}$ in which the split bit for each of said minipackets $e_1, e_2 \ldots, e_{N+K}$ is reset to zero, and wherein predetermined ones of said minipackets $d_1, d_2, \ldots, d_{N+K}$ having a split bit of zero and an activity bit of zero appear first in $e_1, e_2, \ldots, e_{N+K}$ in increasing order of destination address, followed by predetermined ones of said minipackets $d_1, d_2, \ldots, d_{N+K}$ with no data and a split bit of zero and activity bit of one, followed finally by further predetermined ones of said minipackets $d_1, d_2, \ldots, d_{N+K}$ having a split bit of one and an activity bit of zero, in decreasing order of destination address.

19. The central control switch of claim 18, wherein said first sort network further comprises a banyan network whose nodes are $2 \times 2$ sorters.

20. The central control switch of claim 18, wherein said first sort network further comprises a Batcher network.

21. The central control switch of claim 18, wherein said presorting network further comprises a Batcher network.

22. The central control switch of claim 18, wherein said output routing network further comprises a banyan network.

23. The central control switch of claim 1, wherein said packet switch further comprises:
   a) input means for receiving minipackets having predetermined destination addresses and predetermined priority values;
   b) output means for outputting said minipackets in accordance with said predetermined destination addresses;
   c) a buffer module comprising a plurality of storage locations, each of said storage locations corresponding to a column of predetermined ones of said minipackets with different destination addresses;
   d) a time-shared column-fill network having a first input and a first output and a second input and second output;
   e) a holding buffer connected to said second output of said time-shared column-fill network;
   f) a first switching means for alternately connecting said second input of said time-shared column-fill network to said input means and said holding buffer;
   g) a second switching means for connecting said first output of said time-shared column-fill network in succession to said output means and successive storage locations of said buffer module excepting a last storage location thereof, and for simultaneously connecting said first input of said column-fill network to successive adjacent storage locations of said buffer module; and h) means for controlling said first switching means and said second switching means so as to effect:
   i) exchanging predetermined ones of said minipackets having different destination addresses with respective empty row entries or with entries containing minipackets of lower priority value in predetermined ones of said storage locations of said buffer module identified by said respective corresponding destination addresses;
   ii) exchanging remaining ones of said minipackets and displaced ones of said minipackets having lower priority values with respective empty row entries or with entries containing minipackets of lower priority value identified by said respective corresponding destination addresses in successive adjacent ones of said storage locations in a direction opposite to said predetermined one of said storage locations; and
   iii) shifting said minipackets from each storage location by one column toward said predetermined one of said storage locations, such that said minipackets in said predetermined one of said storage locations are transferred to said output means.

* * * * *